United States Patent [19]

Galloway et al.

[11] Patent Number: 4,497,983

[45] Date of Patent: Feb. 5, 1985

[54] ELECTRICAL HOOK SWITCH

[75] Inventors: Michael D. Galloway, Middletown; David J. Gingerich, Swatara; David T. Shaffer, Harrisburg, all of Pa.

[73] Assignee: AMP Incorporated, Harrisburg, Pa.

[21] Appl. No.: 497,381

[22] Filed: May 23, 1983

[51] Int. Cl.³ .................. H01H 9/00; H01H 15/06; H01H 27/00

[52] U.S. Cl. .................. 200/5 R; 200/16 B; 200/16 E; 200/16 R; 200/153 M; 200/159 A

[58] Field of Search .............. 200/1 R, 1 A, 5 R, 6 R, 200/6 B, 6 BA, 6 BB, 6 C, 15, 16 B, 16 E, 16 F, 61.19, 153 M, 159 A, 303, 254

[56] References Cited

U.S. PATENT DOCUMENTS

| 2,814,680 | 11/1957 | Sherrick | 200/16 E |
| 2,275,495 | 3/1942 | Bentley | 200/16 E |
| 3,341,671 | 9/1967 | Anater et al. | 200/16 B |
| 3,781,497 | 12/1973 | Stephenson et al. | 200/61.58 B |
| 3,902,032 | 8/1975 | Koepke | 200/153 M |
| 4,086,548 | 4/1978 | Robbins et al. | 200/6 B |
| 4,096,368 | 6/1978 | Grebner | 200/153 M X |
| 4,317,968 | 3/1982 | Kuhfus | 200/159 A X |
| 4,319,102 | 3/1982 | Van Cleave et al. | 200/1 A X |

Primary Examiner—J. R. Scott

Attorney, Agent, or Firm—Adrian J. LaRue

[57] ABSTRACT

A hook switch comprises a dielectric base member having series of stationary electrical contact members secured in aligned rows therein; the contact members in one row are offset with respect to the contact members in the other row and they include V-shaped contact sections and terminal sections. A dielectric cover member is latchably secured onto the base member. A movable contact assembly mounted in the cover member includes an operating member and a contact-carrying member. The operating member is linearly movable within an opening in the cover member from a normally inoperative position to an operative position against spring members extending between the operating member and the base member. The contact-carrying member has switch segments isolated from one another, each of the switch segments including an electrical contact element of a specified length and the remaining length being dielectric material so that opposing sets of V-shaped contact sections engage respective switch segments to electrically connect the V-shaped contact sections together when engaging the electrical contact elements or to electrically disconnect the V-shaped contact sections when engaging the dielectric material in either of the inoperative or operative positions.

18 Claims, 6 Drawing Figures

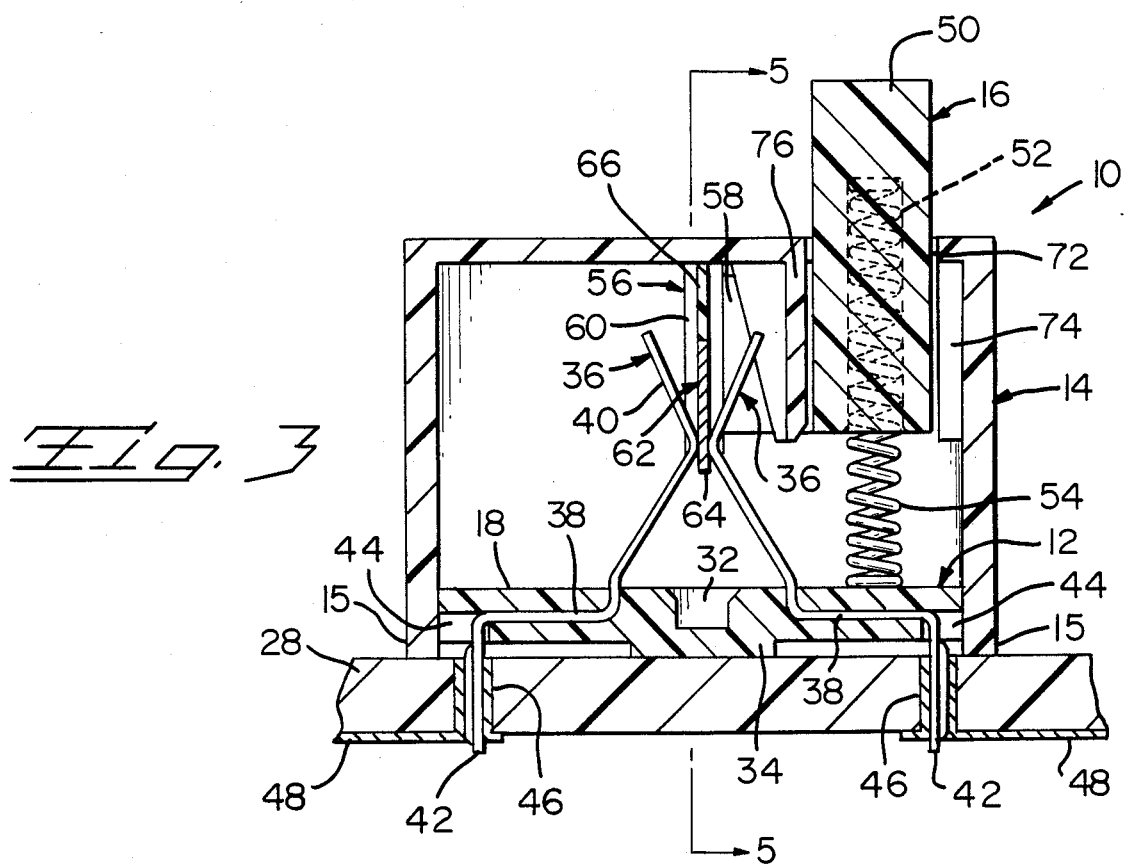
_Fig. 3_
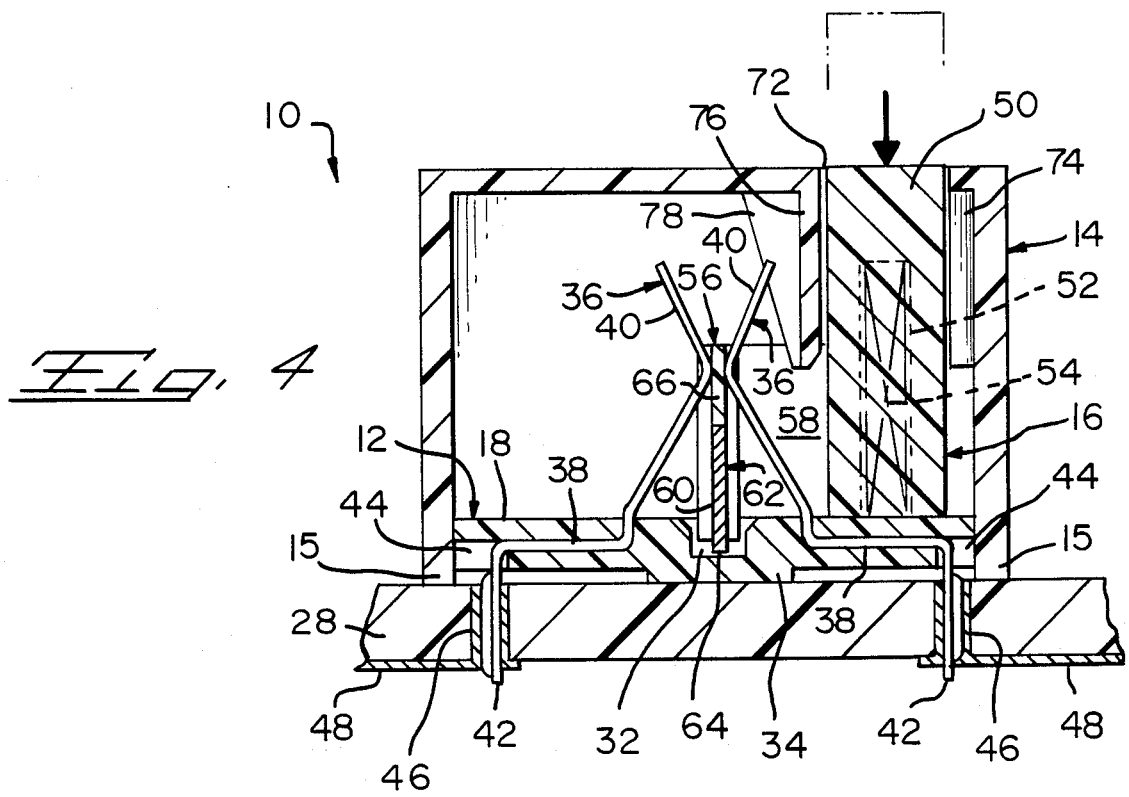
_Fig. 4_

TIME LAG DIAGRAM

ELECTRICAL HOOK SWITCH

FIELD OF THE INVENTION

The present invention relates to electrical switches and more particularly to electrical hook switches.

BACKGROUND OF THE INVENTION

Hook switches are known for use as part of a telephone which are operated when the handpiece containing the transmitter and receiver is placed in the cradle of the telephone housing or removed therefrom thereby operating plunger members which operate the hook switch to operate the telephone or prepare it for operation. Such switches are rugged for long service but they contain a large number of parts and are expensive to manufacture.

Another known type of hook switch has a dielectric base member having cavities along the sides in which coiled spring sections of stationary electrical contact members are disposed while contact sections of the stationary contact members extend toward a center plane of the base member. A movable contact assembly is pivotally mounted on the base member and is maintained in position thereon via a dielectric cover latchably secured onto the base number. An operating member is mounted in the cover member for linear reciprocal movement therein and is in operative engagement with the movable contact assembly. The movable contact assembly includes a dielectric contact-carrying member of semicircular configuration along which arcuate-shaped electrical contact members are mounted in a pattern extending along the exterior surface. The contact-carrying member is mounted in a semicircular operating member having grooves in communication with the arcuate-shaped contact members, the contact sections of the stationary contact members being disposed in respective grooves for electrical engagement with the respective arcuate-shaped contact members or disengagement therewith as the movable contact assembly is rockably moved about its pivots when operating forces are applied to the operating member thereby moving it from a normally position to an operative position against the spring forces being supplied by the contact sections and coiled spring sections of the stationary contact member which spring forces return the movable contact assembly and operating member to their normally inoperative positions when the operating forces are removed.

This hook switch is very complicated as it has numerous parts that have to be assembled rendering it expensive to manufacture in addition to introducing numerous tolerance problems both in manufacturing the parts and in assembling them. The stationary contact members perform a dual function of electrical contact members and supplying the spring forces necessary to operate the movable contact assembly between operative and inoperative positions. It has been found that this dual function fatigues the stationary contact members after numerous opertions causing the switch to malfunction thereby rendering the switch unsuitable for long-lasting service. Moreover, linear movement of the operating member is translated into rotary movement of the movable contact assembly during operation of the switch.

SUMMARY OF THE PRESENT INVENTION

According to the present invention, a hook switch comprises a dielectric base member having series of stationary electrical contact members secured in aligned rows therein; the contact members in one row are offset with respect to the contact members in the other row and they include V-shaped contact sections and terminal sections. A dielectric cover member is latchably secured onto the base member. A movable contact assembly mounted in the cover member includes an operating member and a contact-carrying member. The operating member is linearly movable within an opening in the cover member from a normally inoperative position to an operative position against spring members extending between the operating member and the base member. The contact-carrying member has switch segments isolated from one another, each of the switch segments including an electrical contact element of a specified length and the remaining length being dielectric material so that opposing sets of V-shaped contact sections engage respective switch segments to electrically connect the V-shaped contact sections together when engaging the electrical contact elements or to electrically disconnect the V-shaped contact sections when engaging the dielectric material in either of the inoperative or operative positions.

BRIEF DESCRIPTION OF THE DRAWINGS

FIG. 3 is a cross-sectional view of the switch of FIG. 1 taken along line 3—3 of FIG. 5 showing it in a normally inoperative position.

FIG. 4 is a view similar to FIG. 3 showing the switch in an operative position.

DETAILED DESCRIPTION OF THE INVENTION

Figure 1:
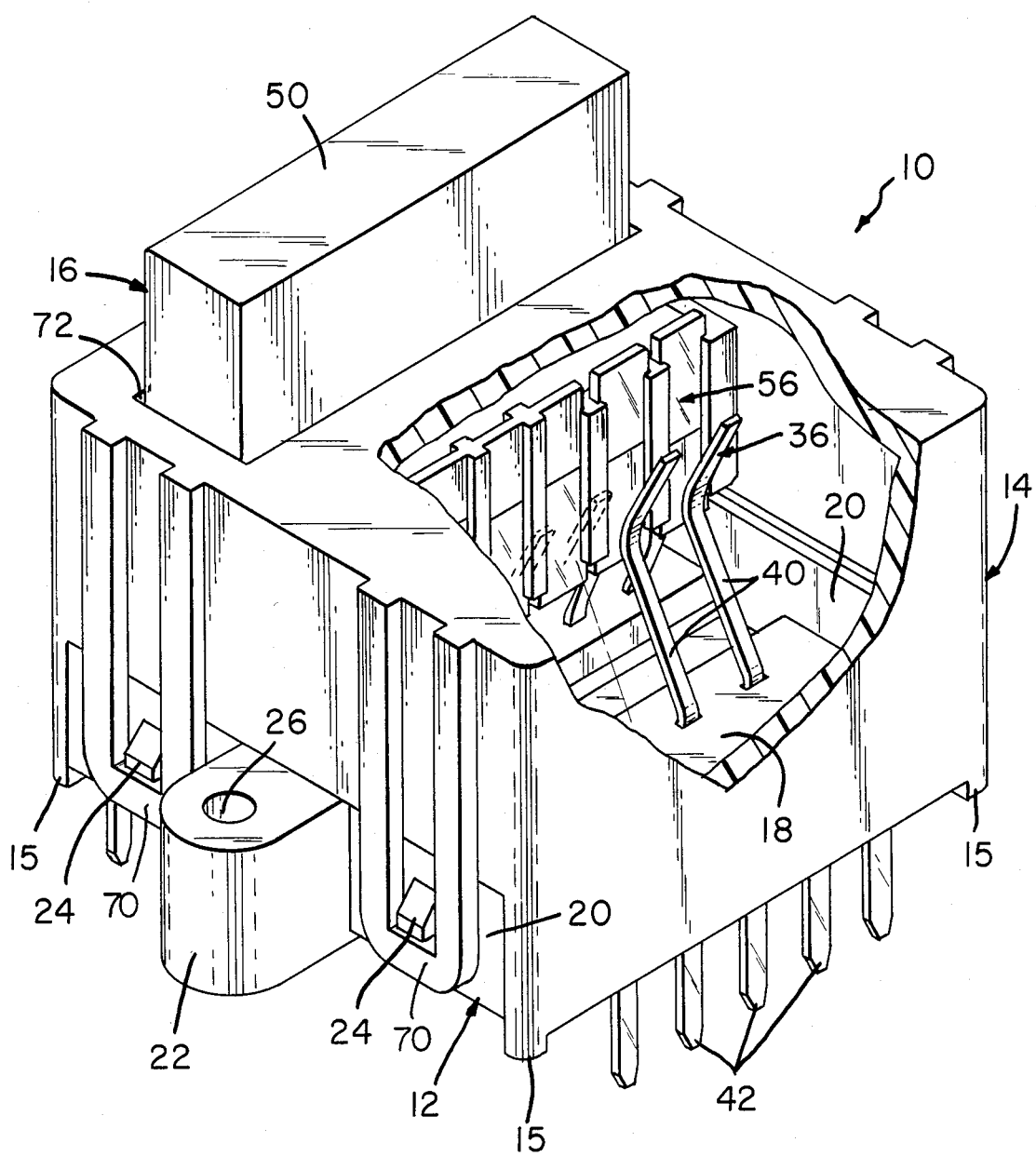
FIG. 1 is a perspective view of the switch of the present invention with part of the cover member broken away.

As shown in FIGS. 1 through 5 of the present invention, an electrical hook switch 10 comprises a dielectric base member 12, a dielectric cover member 14, and a dielectric operating member 16, members 12, 14, and 16 being molded from a suitable dielectric material such as, for example, glass-filled polyester material.

Figure 5:
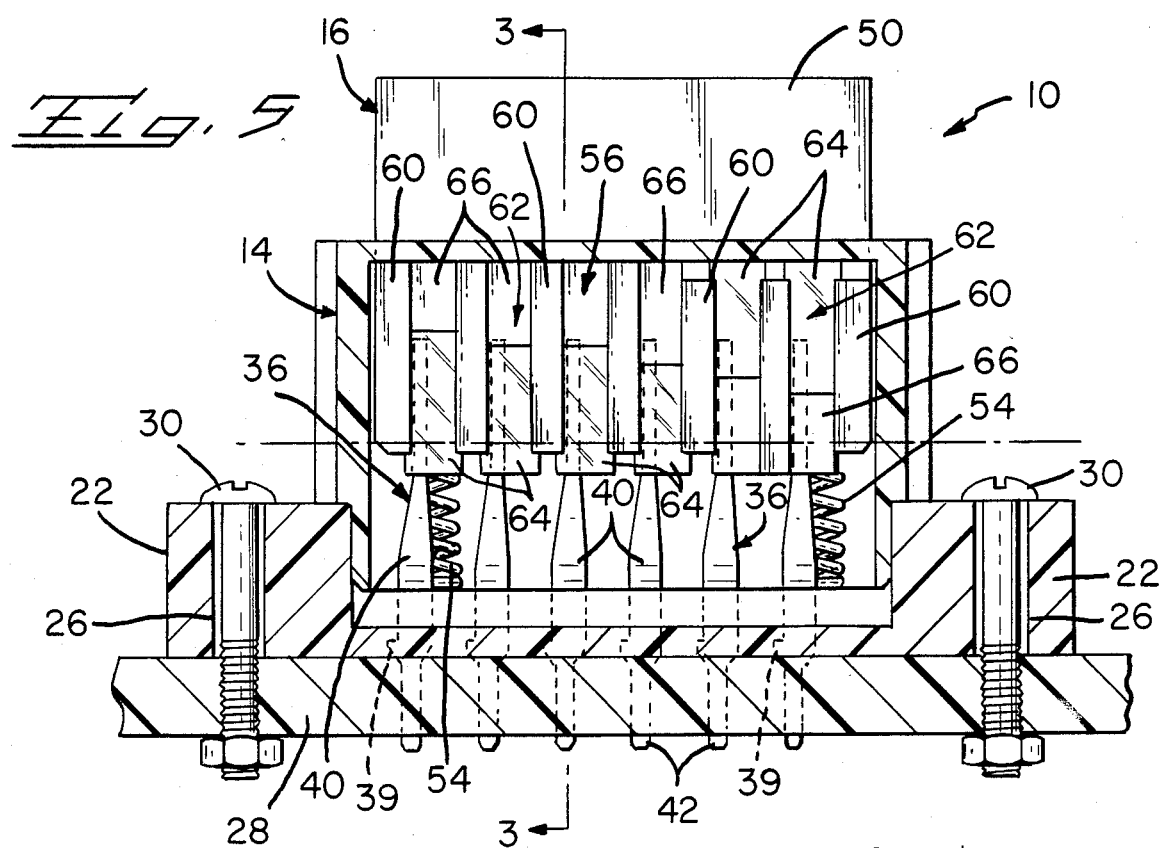
FIG. 5 is a longitudinal cross-sectional view taken along line 5—5 of FIG. 3.

Dielectric base member 12 has a contact-carrying section 18 and sides 20 from which depend mounting projections 22 and latching projections 24. Holes 26 extend through mounting projections 22 to mount switch 10 in position on a circuit board 28 via bolts 30 as illustrated in FIG. 5. Contact-carrying section 18 has a channel 32 extending centrally thereof between sides 20 and a central projection 34 engages board 28 to space section 18 from board 28 when secured thereto.

A series of stationary electrical contacts 36 are secured in contact-carrying section 18 on each side of channel 32 as parallel rows of electrical contacts. Each of stationary electrical contacts 36 includes a securing section 38 secured in contact-carrying section 18, a V-shaped contact section 40 extending above contact-carrying section 18, and a terminal section 42. Securing sections 38 include a projection 39 (FIG. 5) to maintain them in position in section 18. Contact sections 40 are of the same width therealong as shown in FIG. 5.

Figure 2:
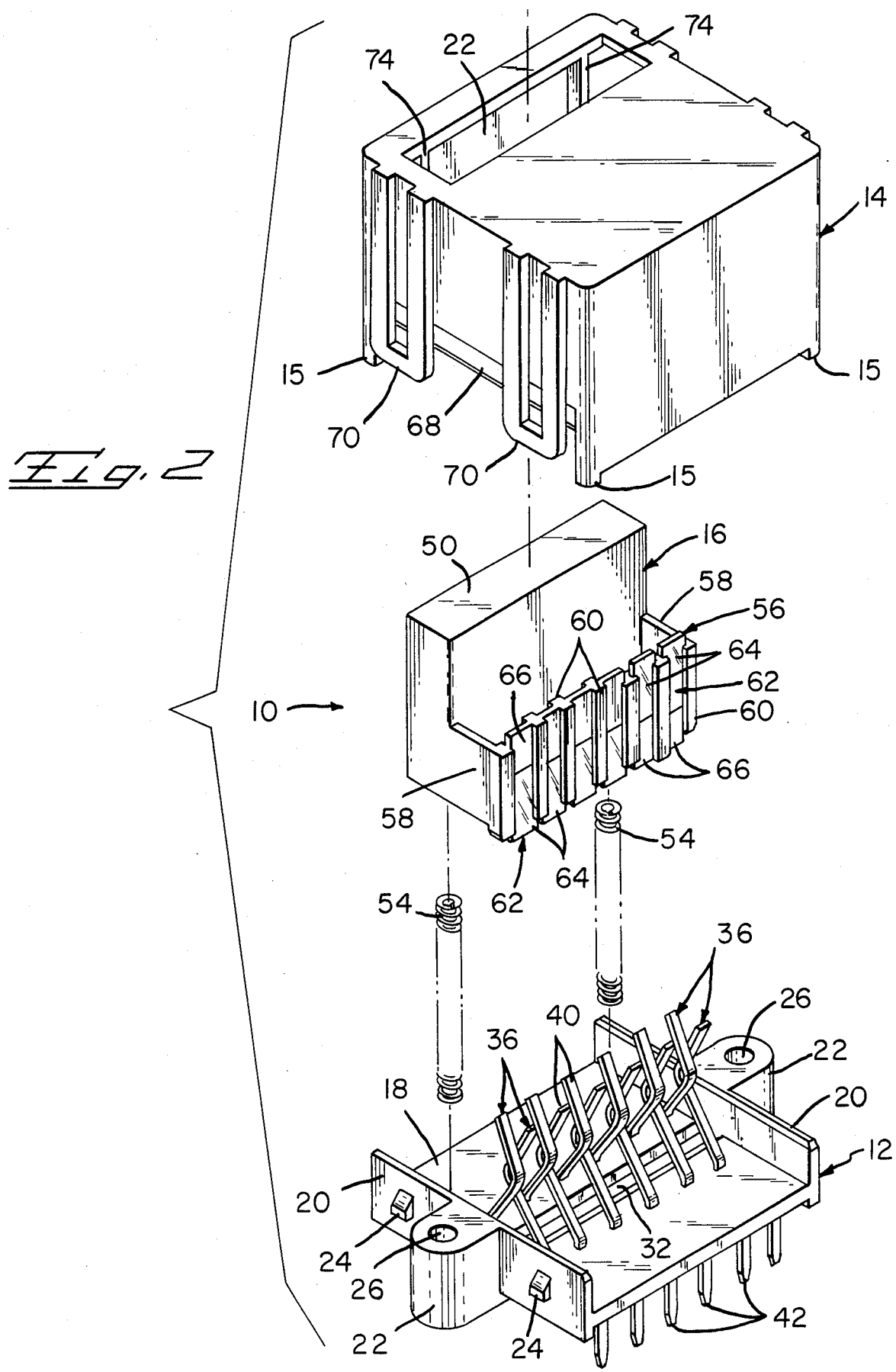
FIG. 2 is an exploded perspective view of parts of the switch of FIG. 1.

Electrical contacts 36 on one side of channel 32 are offset slightly from respective electrical contacts 36 on the other side of channel 32 so that pairs of contact sections 40 overlap each other as shown in FIG. 2 prior to their engaging the switch segments of the operating member 16 as shown in FIGS. 1 and 3 through 5. Recesses 44 are located in the bottom surface of contact-carrying section 18 from which terminal sections 42 extend outwardly beyond contact-carrying section 18 for electrical connection with respective plated-through holes 46 in circuit board 28 which are parts of conductive paths 48 of board 28. Alternatively, electrical sockets can be secured in board 28 and electrically connected to the conductive paths.

Operating member 16 includes an actuating section 50 having blind holes 52 disposed therein in which coil springs 54 are located. A movable contact assembly 56 is part of operating member 16 and is connected to actuating section 50 via integral legs 58. Movable contact assembly 56 comprises a series of ribs 60 between which are disposed contact segments 62, each of contact segments 62 being composed of a metal section 64 and a dielectric section 66 as best shown in FIGS. 3 and 4. From FIG. 5, it can be discerned that metal sections 64 vary in length or they can be of the same length which also causes dielectric sections 66 to vary in length according to the lengths of metal sections 64. Metal sections 64 and dielectric sections 66 of each of contact segments 62 have the same thickness providing for smooth movement of the contact sections 40 over the surface of segments 62 thus enhancing the long operating life. When movable contact assembly 56 is positioned for operation with respect to opposed sets of contact sections 40, contact sections 40 in one row of contacts 36 engage respective contact segments 62 on one side of movable contact assembly 56 while contact sections 40 of the other row of stationary contacts 36 engage respective contact segments 62 on the other side of movable contact assembly 56. Opposing sets of contact sections 40 in engagement with respective sides of a respective contact segment 62 will be either electrically connected together via metal sections 64 or electrically disconnected from each other via dielectric sections 66, depending on the position of movable contact assembly 56 relative to contact sections 40 as shown in FIGS. 3 and 4. It is also to be noted from FIGS. 3 and 4 that the bights of V-shaped contact sections 40 result in point contact with metal contact sections 64 or dielectric sections 66 of contact segments 62 and this is accomplished as a result of the V-shaped configuration of contact sections 40. This results in reduced contact resistance and friction during the operation of the switch.

Contacts 36 are stamped and formed from a suitable metal having the desired spring characteristics so that the bights of the pairs of V-shaped contact sections 40 springably engage respective contact segments 62 resulting in point contacts by the contact sections 40 on respective segments 62.

Cover member 14 has recesses 68 in respective sides thereof in which sides 20 of contact-carrying section 18 are disposed and integral flexible latching members 70 latchably engage latching projections 24 on sides 20 to latchably secure cover member 14 and base member 12 together. Legs 15 are located at the bottom corners of cover member 14 and they, along with projection 34 of contact-carrying section 18, maintain switch 10 spaced from board 28. A rectangular opening 72 extends through the top of cover member 14 through which actuating section 50 of operating member 16 extends and coil springs 54 in holes 52 engage contact-carrying section 18 to maintain operating member 16 in a normally inoperative position as shown in FIG. 3 with movable contact assembly 56 engaging the upper surface of cover member 14 to limit the upward movement of operating member 16. Actuating section 50 bottoms against contact-carrying section 18 as shown in FIG. 4 to limit inner movement of operating member 16 in its operative position with the bottom of movable contact assembly 56 extending into channel 32. Spaced projections 74 extend inwardly from a side wall of cover member 14 in alignment with opening 72 to guide actuating section 50 therealong and a part wall section 76 is disposed opposite projections 74 and extends inwardly from the upper wall of cover member 14 from opening 72 to also guide actuating section 50 therealong. Spaced strengthening ribs 78 extend along wall section 76 and part of the upper surface of the top wall of cover member 14 to strengthen wall section 76 and also act as guides along which contact sections 40 move during operation of movable contact assembly 56.

In assembly, rows of stationary electrical contacts 36 are positioned in a mold whereafter dielectric material is introduced into the mold to form dielectric base member 12 having parallel rows of electrical contacts 36 molded in place therein on opposite sides of channel 32 with terminal sections 42 extending outwardly from the bottom surface of contact-carrying section 18 whereas V-shaped contact sections 40 extend outwardly from the top surface of section 18 with securing sections 38 disposed within section 18. Contacts 36 in one of the rows of electrical contacts are slightly offset with respect to electrical contacts 36 in the other row of electrical contacts so that V-shaped contact sections 40 overlap as opposing sets or pairs of contact sections as shown in FIG. 2. Coil springs 54 are positioned in holes 52 of operating member 16 whereafter movable contact assembly 56 is moved into engagement with contact sections 40 with coil springs 54 engaging section 18, after which cover member 14 is latchably secured onto base member 12 via latching members 70 latchably engaging latching projections 24 with actuating section 50 extending through rectangular opening 72 in cover member 14. In this position coil springs 54 move actuating section 50 to its outermost position with movable contact assembly 56 engaging the inner top surface of cover member 54 as shown in FIG. 3. In this position respective pairs of contact sections 40 engage respective contact segments 62 on each side thereof. Ribs 60 on movable contact assembly 56 maintain contact sections 40 in engagement with respective contact segments 62 during movement thereof relative to contact sections 40, therefore also acting as guides for contact sections 40.

Figure 6:
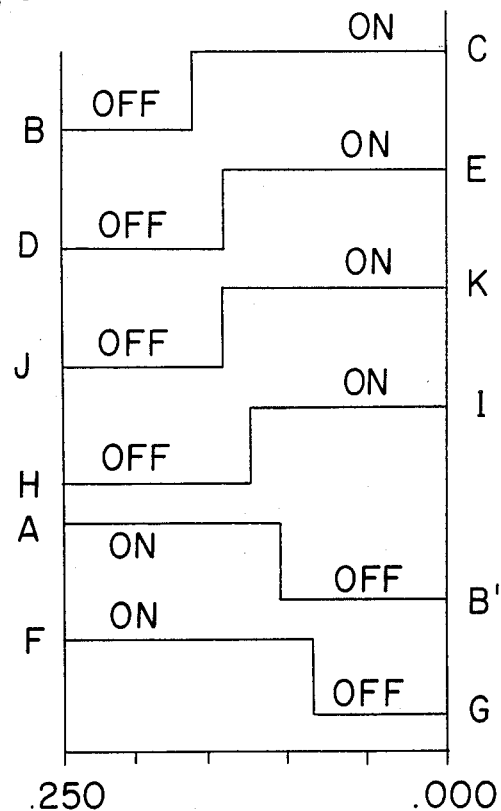
FIG. 6 is a typical operating diagram of the contact members of the switch over a specified distance.

FIG. 6 is an operating diagram for hook switch 10 wherein the right side of the diagram illustrates one row of stationary electrical contacts 36 and the left side illustrates the other row of stationary electrical contacts 36 which have their respective contact sections 40 arranged as opposite pairs in engagement with respective contact segments 62 of movable contact assembly 56. As can be discerned, the movement of movable contact assembly 56 is from right to left which indicates the off-on conditions of each of the pairs of contact sections 40 as contact segments 62 move with respect to contact sections 40 when movable contact assembly 56 is moved upon actuation of actuating section 50 against the bias of coil springs 54. The reverse operation takes place when it is moved to its normally inoperative position. Thus, when actuating section 50 is in its normally inoperative position, four of the pairs of contact sections 40 will be in an actuated position due to the fact that they will be in electrical engagement with each other via metal sections 64, whereas two of the pairs of contact sections 40 will be in a non-actuated position and will not be connected because their contact sections will be in engagement with dielectric sections 66 as shown in FIG. 6. The reverse situation takes place as shown in FIG. 6 when an actuating force is applied to actuating section 50 causing movable contact assembly 56 to move to its actuated position which results in four of the pairs of contact sections 40 being in a non-actuated position while the remaining two pairs of contact sections 40 are in an actuated position.

If desired, sealing material such as an epoxy material or other suitable sealing material can be disposed in recess 44 to form a seal along the terminal sections 42.

The hook switch is of simplified construction, has a long operating life, and can easily be connected to a circuit board.

We claim:

1. An electrical switch of the type comprising a dielectric base member having parallel rows of a series of stationary electrical contact members mounted in the base member such that the electrical contact members are arranged as opposing pairs of contact sections of opposite sides of a plane extending between the parallel rows of the series of contact members, a movable contact assembly movably mounted between a cover member and the base member with pairs of the contact sections engaging respective contact segments of the movable contact assembly, each of the contact segments including a metal section and a dielectric section to electrically connect the contact sections together when the metal sections are moved to contact-operating positions and to electrically disconnect the contact sections when the dielectric sections are moved to noncontact-operating positions, and an operating member for operating the movable contact assembly to the contact-operating and noncontact-operating positions, characterized in that:

said contact segments being planar and said opposing pairs of contact sections continuously engaging respective contact segments on opposite sides thereof as said movable contact assembly moves between the contact-operating and noncontact-operating positions or is maintained at the contact-operating or noncontact-operating positions to electrically connect or disconnect the opposing pairs of contact sections;

said operating member and said movable contact assembly are connected together to move said movable contact assembly relative to said opposing pairs of contact sections when said operating member is moved between the contact-operating and noncontact-operating positions; and spring means engaging said operating member to maintain the operating member in a normally inoperative position.

2. An electrical switch as set forth in claim 1, characterized in that said contact sections are V-shaped so that bights of the contact sections engage the contact segments.

3. An electrical switch as set forth in claim 2, characterized in that said opposing pairs of contact sections are offset with respect to one another.

4. An electrical switch as set forth in claim 1, characterized in that said movable contact assembly has ribs separating said contact segments and maintaining opposing pairs of said contact sections in engagement with respective contact segments.

5. An electrical switch as set forth in claim 1, characterized in that said spring means are disposed in holes in said operating member and engage said base member, said operating member including an actuating member extending through an opening in said cover member.

6. An electrical switch as set forth in claim 5, characterized in that guide members are located on said cover member in alignment with said opening to guide said actuating member during movement therealong.

7. An electrical switch as set forth in claim 6, characterized in that integral legs connect said movable contact assembly to said actuating member and said movable contact assembly engages the inside top surface of said cover member limiting movement of said operating member to the normally inoperative position.

8. An electrical switch as set forth in claim 1, characterized in that the lengths of the metal sections and dielectric sections can vary.

9. An electrical switch, comprising:

dielectric base means having parallel rows of series of stationary electrical contact members mounted therein and arranged such that contact sections of the contact members are disposed as opposing pairs of said contact sections on opposite sides of a plane extending between the parallel rows of the contact members;

operating means including movable contact assembly means;

cover means secured to said base means and having an opening through which said operating means extends;

spring means extending between said base means and said operating means maintaining said operating means and said movable contact assembly means in a normally inoperative position and being movable to an operative position when an operating force is applied to said operating means;

said movable contact assembly means comprising separate contact segments each of which is engaged on opposite sides by a respective opposed pair of said contact sections, each of said contact segments being in the form of a metal section and a dielectric section so that, depending on the position of the movable contact assembly, when the pairs of said contact sections engage the metal sections of the respective contact segments, the contact sections will be electrically connected and, when the pairs of said contact sections engage the dielectric sections of the respective contact segments, the contact sections will be disconnected.

10. An electrical switch as set forth in claim 9, wherein said contact sections are V-shaped with bights engaging said contact segments.

11. An electrical switch as set forth in claim 9, wherein said opposing pairs of contact sections are offset with respect to one another.

12. An electrical switch as set forth in claim 9, wherein said movable contact assembly has ribs separating said contact segments and maintaining opposing pairs of said contact sections in engagement with respective contact segments.

13. An electrical switch as set forth in claim 9, wherein the lengths of the metal sections and dielectric sections can vary.

14. An electrical switch as set forth in claim 9, wherein latch means on said base means and said cover means latch them together.

15. An electrical switch, comprising:
first electrical contact means and second electrical contact means, said first electrical contact means defining a first series of electrical contact members having mounting sections mounted in a dielectric member and contact sections, said second electrical contact means defining a second series of electrical contact members having separate planar contact section means, each of the planar contact section means being in the form of a metal section and a dielectric section, a pair of said contact sections springably engaging respective planar contact section means;
spring-biased actuating means as part of one of said electrical contact means to move said pairs of contact sections and said planar contact section means relative to each other so that when said pairs of contact sections and said respective planar contact section means move relative to each other, said pairs of contact sections will be electrically connected together when in electrical engagement with the respective metal sections and will be disconnected when in engagement with the respective dielectric sections.

16. An electrical switch as set forth in claim 15, wherein the spring-biased actuating means is part of the first electrical contact means.

17. An electrical switch as set forth in claim 15, wherein the length of the metal section relative to the dielectric section of each of said planar contact section means can vary.

18. An electrical switch as set forth in claim 15, wherein said contact sections are arcuate.

* * * * *